US009964467B2

(12) United States Patent
Haye (10) Patent No.: US 9,964,467 B2
(45) Date of Patent: May 8, 2018

(54) METHODS AND SYSTEMS FOR ESTIMATING RESIDUAL USEFUL LIFE OF A ROLLING ELEMENT BEARING

(71) Applicant: United Technologies Corporation, Hartford, CT (US)

(72) Inventor: Sheridon Everette Oliver Haye, Mansfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 232 days.

(21) Appl. No.: 14/879,981

(22) Filed: Oct. 9, 2015

(65) Prior Publication Data

US 2017/0102290 A1 Apr. 13, 2017

(51) Int. Cl.
*G01M 13/04* (2006.01)
*F16C 19/52* (2006.01)

(52) U.S. Cl.
CPC ......... *G01M 13/045* (2013.01); *F16C 19/527* (2013.01)

(58) Field of Classification Search
None
See application file for complete search history.

(56) References Cited

U.S. PATENT DOCUMENTS

| | | | | |
|---|---|---|---|---|
| 5,852,793 A * | 12/1998 | Board | .................... | G01H 1/003 |
| | | | | 702/183 |
| 6,199,018 B1 | 3/2001 | Quist | | |
| 2005/0119840 A1 * | 6/2005 | Astley | ................. | G01M 13/045 |
| | | | | 702/56 |
| 2005/0171736 A1 * | 8/2005 | Kang | ..................... | G01H 1/006 |
| | | | | 702/185 |
| 2010/0030492 A1 * | 2/2010 | Kar | ......................... | F16C 19/52 |
| | | | | 702/39 |

FOREIGN PATENT DOCUMENTS

| | | |
|---|---|---|
| CA | 2875071 | 12/2013 |
| EP | 2208981 | 7/2010 |

OTHER PUBLICATIONS

EP Search report dated Mar. 2, 2017 in EP Application No. 16192051.7.

* cited by examiner

*Primary Examiner* — Paul West
*Assistant Examiner* — Mark A Shabman
(74) *Attorney, Agent, or Firm* — Snell & Wilmer LLP (57) ABSTRACT

Estimating residual useful life of a rolling element bearing in an operating gas turbine engine is provided. A processor receives a vibration signal from a vibration sensor. The vibration signal includes a vibratory response of the rolling element bearing. Processor detects a vibratory pattern of the rolling element bearing from the vibration signal and compares the vibratory pattern to a reference vibratory pattern. Processor identifies a failure propagation stage in which the vibratory pattern matches the reference vibratory pattern. Processor correlates the failure propagation stage to the residual useful life remaining in the rolling element bearing and generates an output signal representing the residual useful life remaining in the rolling element bearing.

14 Claims, 5 Drawing Sheets

METHODS AND SYSTEMS FOR ESTIMATING RESIDUAL USEFUL LIFE OF A ROLLING ELEMENT BEARING

FIELD

The present disclosure relates to gas turbine engines, and more specifically, to systems and methods for estimating the residual useful life of a rolling element bearing.

BACKGROUND

Rolling element bearings, often used in rotor bearing systems of gas turbine engines for supporting rotating shafts, may be subjected to cyclical high loading forces, which may result in failure of the rolling element bearings. A primary failure mode is bearing spall evidenced by the release of particles from the failed rolling element bearing into the lubricating system. Conventional methods for detecting spall initiation in a rolling element bearing include detection of the presence of particles by an oil debris monitoring system. As not every spall progresses to failure within an expected period of time, the detection of spall initiation cannot be a predictor of how far along the rolling element bearing is in the failure progression process and when the imbalance response will occur with impending failure.

SUMMARY

A method is provided for estimating residual useful life of a rolling element bearing in an operating gas turbine engine, according to various embodiments. The method comprises receiving, by a processor, a vibration signal from a vibration sensor. The vibration signal includes a vibratory response of the rolling element bearing. Processor detects a vibratory pattern of the rolling element bearing from the vibration signal and compares the vibratory pattern to a reference vibratory pattern. Processor identifies the failure propagation stage in which the vibratory pattern matches the reference vibratory pattern. Processor correlates the failure propagation stage to the residual useful life remaining in the rolling element bearing and generates an output signal representing the residual useful life remaining in the rolling element bearing.

A method is provided for estimating residual useful life of a rolling element bearing of a rotor bearing system in an operating gas turbine engine, according to various embodiments. The method comprises receiving by a processor, a vibration signal from a vibration sensor of the rotor bearing system. The vibration signal includes a vibratory response associated with a vibratory pattern of the rolling element bearing. Processor determines relative contributions of an impulse response and an imbalance response in the vibratory response. The relative contributions define a vibratory pattern. Processor determines a failure propagation stage of the rolling element bearing from the vibratory pattern and correlates the failure propagation stage to the residual useful life remaining in the rolling element bearing.

A system is provided for estimating residual useful life of a rolling element bearing in an operating rotor bearing system, according to various embodiments. The system comprises a vibration monitoring system including a processor for detecting a vibratory response of the rolling element bearing by receiving a vibration signal representing the vibratory response. Processor is configured, in response thereto, to detect a vibratory pattern from the vibratory response and compare the vibratory pattern to a reference vibratory pattern. Processor identifies the failure propagation stage in which the vibratory pattern matches the reference vibratory pattern. Processor correlates the failure propagation stage to the residual useful life remaining in the rolling element bearing.

In any of the foregoing embodiments, detecting the vibratory pattern comprises measuring a vibration frequency and a vibration amplitude to obtain a measured vibration frequency and a measured vibration amplitude. Detecting the vibratory pattern comprises detecting a change in the vibratory pattern. The vibratory pattern comprises a vibration frequency range and a vibration amplitude range and detecting the change in the vibratory pattern comprises detecting a shift in the vibration frequency range and a diminution in the vibration amplitude. The reference vibratory pattern comprises a reference vibration frequency range and a reference vibration amplitude range, wherein comparing the vibratory pattern to the reference vibratory pattern comprises comparing the measured vibration frequency against the reference vibration frequency range and the measured vibration amplitude against the reference vibration amplitude in the failure propagation stage. Comparing the vibratory pattern comprises comparing a spectral diagram of the vibratory pattern against a spectral diagram of the reference vibratory pattern in the failure propagation stage. A health score range may be assigned to the rolling element bearing within each failure propagation stage. Assigning a health score range comprises determining a percentage of the vibration frequency and the vibration amplitude within the vibratory pattern.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the present inventions, it should be understood that other embodiments may be realized and that logical changes and adaptations in design and construction may be made in accordance with the present inventions and the teachings herein. Thus, the detailed description herein is presented for purposes of illustration only and not of limitation. The scope of the present inventions is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step.

Various embodiments are directed to systems and methods for estimating the residual useful life of a rolling element bearing in a rotor bearing system of an operating gas turbine engine. Various embodiments assess changes in vibratory responses and patterns of the rolling element bearing as spalling (failure) thereof progresses, providing information as to how far along the rolling element bearing is toward failure and the residual useful life remaining in the rolling element bearing. A vibratory response includes a ratio of an imbalance response to an impulse response. As used herein, the term "impulse response" refers to a response of the rolling element bearing to a very brief excitation caused by a defect (e.g., spalling) on the rolling element bearing (i.e., on a bearing race or a ball thereof). The impulse response is the response obtained from exciting the rolling element bearing (and a stationary housing thereof) and the rolling element bearing (and the stationary housing thereof) responding at its natural frequency (high frequency (greater than, for example, 1000 kHz)). The term "imbalance response" refers to the response of the entire rotor bearing system due to the displacement of the rotor's center of mass from the center line. This displacement is evident every rotation of the rotor and hence comprises the spin frequency of the rotor (e.g., low hundreds Hertz). The imbalance response is equal to the product of mass×eccentricity. Thus, the frequency range of the vibratory response identifies whether the vibratory response is more of an impulse response or an imbalance response (i.e., the relative contributions of the impulse response and the imbalance response).

Figure 1A:
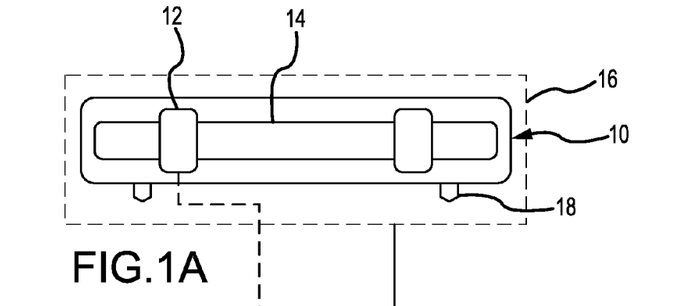
FIG. 1A is a schematic representation of a rolling element bearing supporting a shaft in a rotor bearing system including a vibration sensor, according to various embodiments.
Figure 1B:
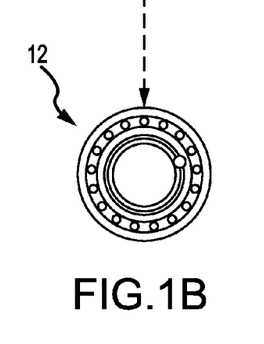
FIG. 1B is a schematic representation of the rolling element bearing of FIG. 1A, according to various embodiments.

Referring now to FIGS. 1A and 1B according to various embodiments, a rotor bearing system 10 comprising a rolling element bearing 12 supporting a shaft 14 in an operating gas turbine engine 16 is shown. A stationary housing encloses the rolling element bearing 12. The rotor bearing system 10 includes a vibration sensor 18 for monitoring vibration responses of the rotor bearing system 10. Changes in the vibration responses of the rotor bearing system 10 as spalling (a "bearing defect") of the rolling element bearing 12 progresses are used to estimate how close the rolling element bearing 12 is toward failure and the residual useful life remaining in the rolling element bearing according to various embodiments.

More specifically, the vibration sensor 18 sends a vibration signal to a vibration monitoring system. The vibration signal represents the vibration response of the rolling element bearing in the rotor bearing system of the operating gas turbine engine. The vibration monitoring system may include a processor 400 that receives the vibration signal and in response thereto, is configured to detect vibratory patterns of the rotor element bearing 12 in rotor bearing system 10, including changes in the vibratory patterns as failure progresses. The vibratory patterns comprise the vibratory response or a change in the vibratory response. Vibration monitoring systems are well known to those skilled in the art and will not be described here in any detail. While the processor 400 may be included in the vibration monitoring system 300, it may additionally or alternatively be separate therefrom. Broad band vibration monitoring may be used, for example, using vibration monitoring implementing International Organization for Standardization ("ISO") ISO 10816, which is hereby incorporated by reference for any purpose. Vibration measurements may be made in three directions (horizontal, vertical, axial). ISO 10816 keeps the lower frequency range flexible between 2 Hz and 10 Hz, depending on the machine type. The upper frequency is 1000 Hz. ISO 10816 operates with the term vibration amplitude, which, depending on the machine type, can be an RMS value of vibration velocity, acceleration or displacement. For certain vibration monitoring machines, ISO 10816 also recognizes peak-to-peak values as condition criteria.

Figure 2:
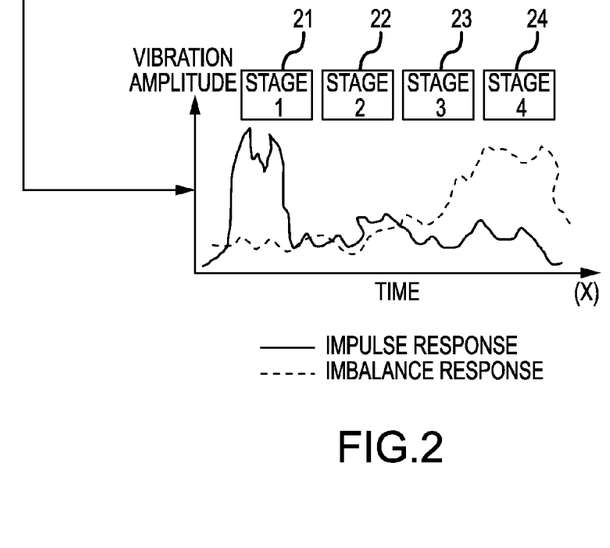
FIG. 2 is an exemplary spectral diagram of a spall progression of the rolling element bearing such as depicted in FIG. 1, according to various embodiments.
Figure 3:
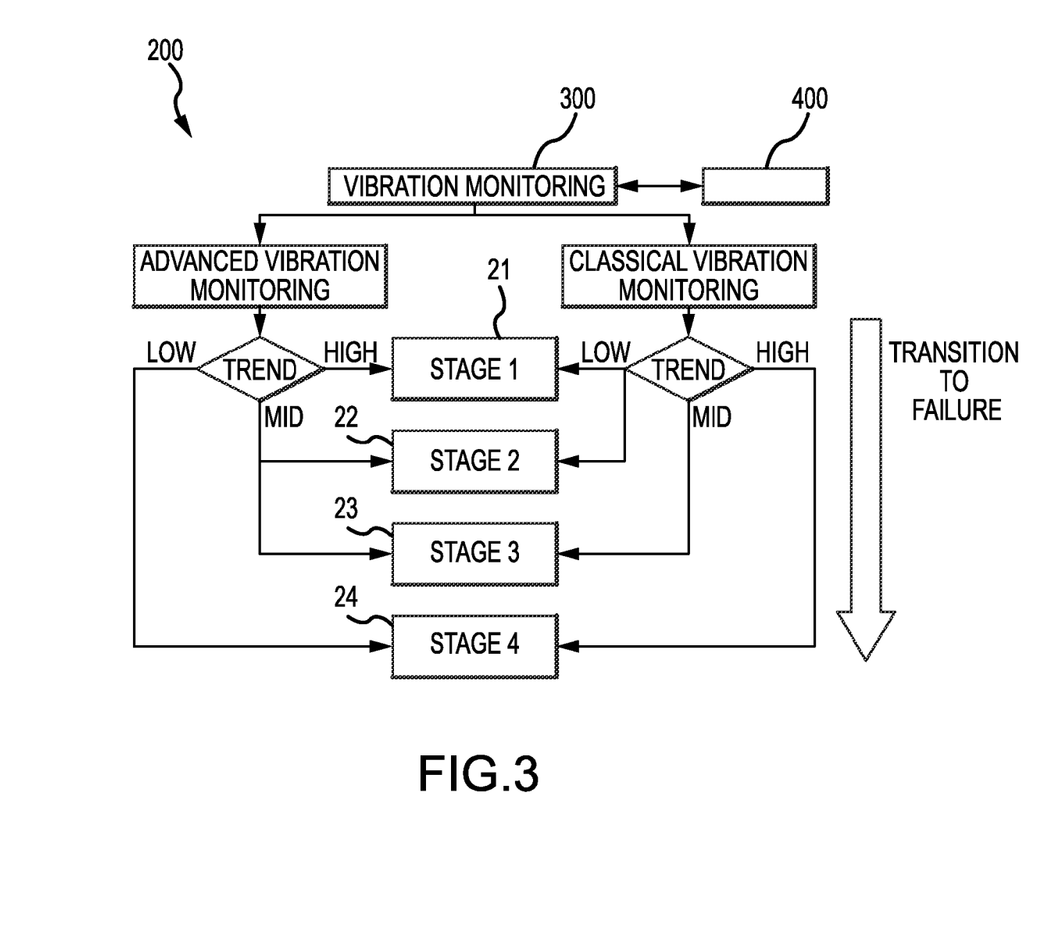
FIG. 3 is a system for estimating the residual useful life of the rolling element bearing such as depicted in FIG. 1, according to various embodiments.
Figure 4:
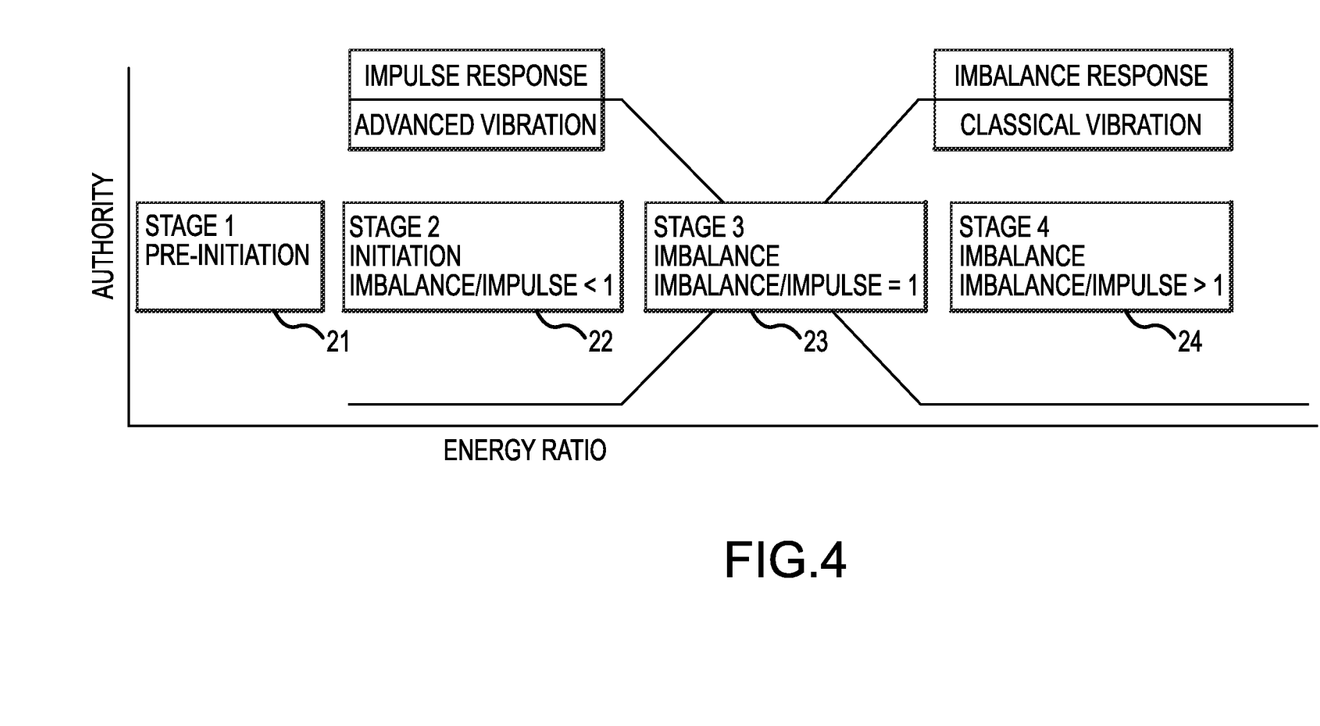
FIG. 4 is a weighting diagram illustrating the respective contributions of an impulse response and an imbalance response to the systems and methods for estimating the residual useful life of the rolling element bearing, according to various embodiments.

Referring now to FIGS. 2 through 4, according to various embodiments, the stage of failure of the rolling element bearing in the rotor bearing system may be determined by assessing changes in vibratory response/vibratory patterns of the rolling element bearing 12 as spalling (failure) progresses. The spectral vibratory response of spall progression follows a predictable vibratory specific pattern as the rolling element bearing 12 deteriorates to failure (see, e.g., the spectral diagram in FIG. 2). The rolling element bearing defect (the spalling) causes an impulse for every rotation of the shaft (for a single point defect). As the rolling element bearing degrades or deteriorates (spalls), the defect becomes more widespread causing the loss of centerline of the bearing and an increase in other vibration frequencies (broadband). As the fault progresses, the impulse response amplitude is 'drowned-out' and the imbalance response dominates.

The time between spall initiation and rolling element bearing failure is defined by successive failure propagation stages (referred to herein as Stage 1 (21), Stage 2 (22), Stage 3 (23), and Stage 4 (24) as depicted in FIGS. 2 and 3. The vibratory specific patterns fall within the bounds of each failure propagation stage. FIG. 2 is an exemplary spectral diagram of the successive failure propagation stages with exemplary vibratory specific patterns within the bounds of each stage. FIG. 3 depicts a weighting diagram of an impulse response (Impulse Response Vibration Monitoring, also known as Advanced Vibration Monitoring ("Advanced Vibe")) of the rotor bearing system and an imbalance response (Imbalance Response Vibration Monitoring, also known as Classical Vibration Monitoring) in the different failure propagation stages. FIG. 4 similarly depicts a weighting diagram between impulse response and imbalance response indicating the relative contributions thereof through the failure propagation stages. Still referring to FIGS. 2 through 4, spalling (deterioration) of the rolling element bearing 12 begins in Stage 1. Impulse response vibration monitoring may detect spall initiation, i.e., the beginning of bearing deterioration by detecting higher vibration frequency utilizing an enveloping method as known to one skilled in the art at spall initiation relative to the vibration frequency in subsequent stages. Stage 1 is a pre-initiation stage. The spectral diagram of FIG. 2 shows the highest impulse response within Stage 1 due to the defect (spall initiation). In Stage 1, the impulse response (contribution) to the vibratory response is higher than the imbalance response (see also, FIG. 3). The detection capability within this frequency range is hardware dependent. A vibration sensor not capable of the associated high frequency range will not detect the vibratory response, and will falsely indicate a defect-free rolling element bearing.

As deterioration progresses from Stage 1, the vibration response parameters begin to change. For example, the dominant frequency range of the vibratory response starts to shift lower and the vibration amplitude begins to diminish. As frequency shifts occur and the vibration amplitude diminishes, an imbalance response is detected as hereinafter described. Stage 2 is an initiation stage. The vibratory response due to the bearing defect is detectable within a lower frequency range than in Stage 1. Key defect feature indicators are determined by signal demodulation from the structural resonance. In Stage 2, there is less impulse response relative to that in Stage 1 and more imbalance response (FIG. 3), i.e., the imbalance/impulse ratio is less than one.

Stage 3 is the stage in which the imbalance response is sensed by the vibration sensor. At this stage, the impulse response due to the bearing defect is fully developed with detectable side lobes within the response frequency range. The detectible imbalance response is also apparent in Stage 3. Impulse response limits (i.e., maximum amplitude as measured, for example, in inches per second) depends upon the vibratory environment) are exceeded and the vibratory response is more of an imbalance response. The relationship (i.e., weighting as depicted in FIGS. 3 and 4) between impulse response and imbalance response is used in this stage to track the stage of failure and predict when Stage 4 will be activated. Stage 3 is the transitional region (as measured by time) between impulse response at high vibration frequency and imbalance response). In Stage 3, the imbalance response/impulse response as measured in vibration amplitude is equal to one.

Stage 4 shows a definite change in vibratory response as evidenced by the spectral diagram of FIG. 2. The imbalance response dominates the vibratory response (see also, FIGS. 3 and 4). The impulse response is growing but the imbalance response overshadows the overall energy content. With an impulse response excursion, the ratio between the impulse response and imbalance response is used for further damage propagation assessment. At this stage, the imbalance/impulse ratio will exceed one, thereby signifying the dominant imbalance response. With further damage propagation, it will be observed that the impulse response will spread across additional frequency range and imbalance exciting other response includes with additional non-interval vibration components.

Figure 5:
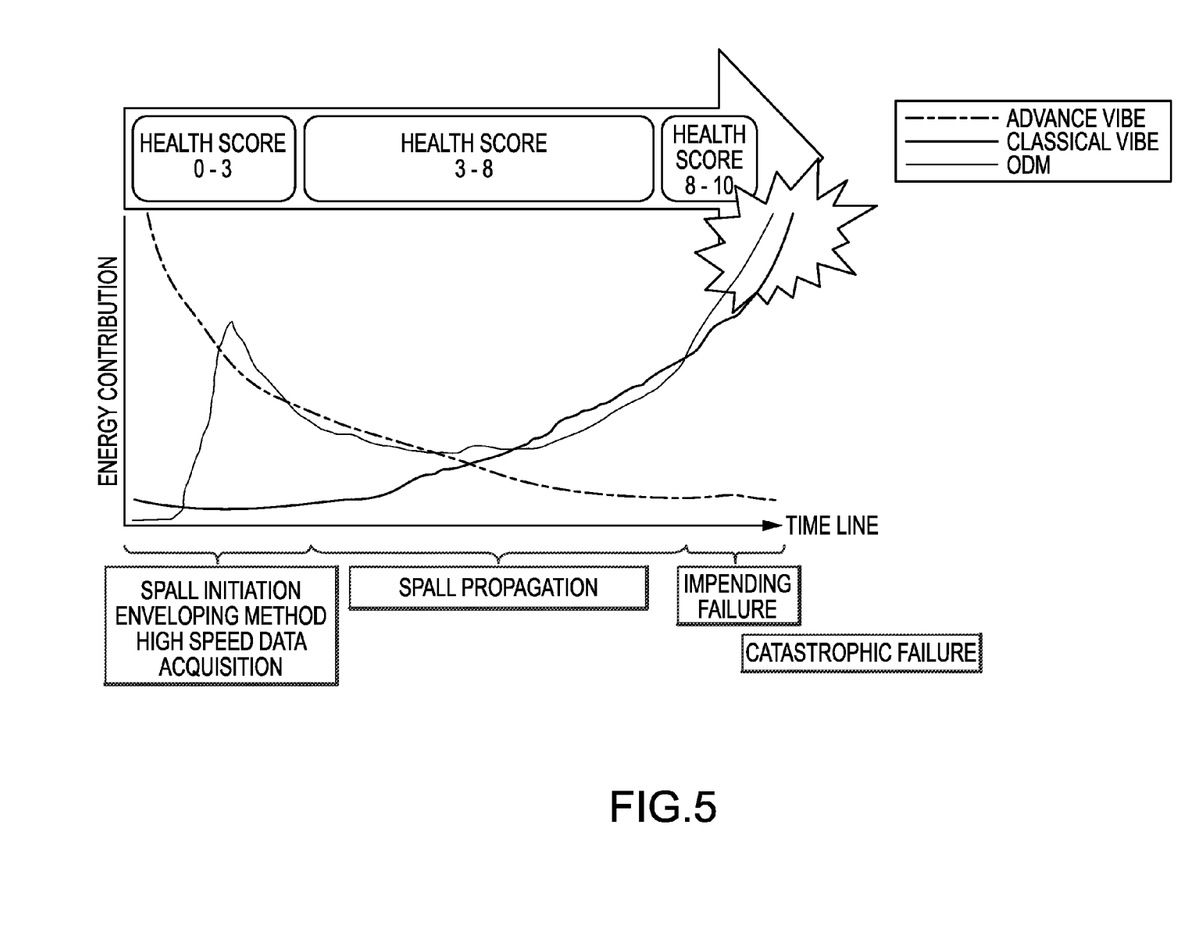
FIG. 5 is a graph illustrating energy contribution (y-axis) to the vibratory response along a time line (x-axis) and assignment of exemplary health scores in the failure propagation stages, according to various embodiments.

Referring now to FIG. 5, according to various embodiments, a health score may be assigned to the rolling element bearing as it progresses through the various failure propagation stages. For example, as depicted in FIG. 5, the rolling element bearing may be assigned a health score of 0-3 when the rolling element bearing is in Stage 1, a health score of 3-8 when in the transitional region, and a health score of 8-10 when in Stage 4. Of course, the health scores may be any type of grading system, with the lower scores in Stage 4 rather than as shown by example in FIG. 5. The assignment of the various health scores within a single stage will be hereinafter described.

Figure 6:
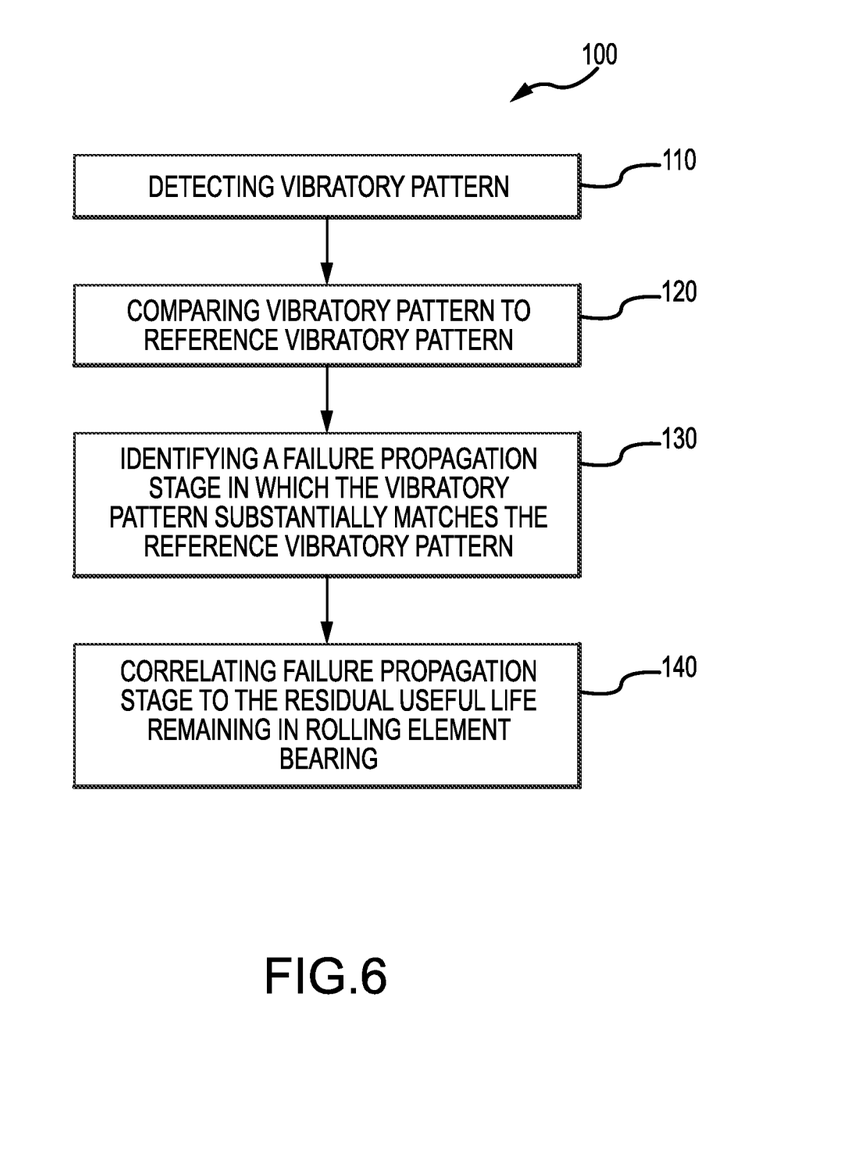
FIG. 6 is a flow diagram of a method for estimating the residual useful life of the rolling element bearing such as depicted in FIG. 1, according to various embodiments.

Referring now to FIG. 6, according to various embodiments, a method 100 for estimating residual useful life of the rolling element bearing begins by detecting the vibratory pattern of the rotor bearing system in an operating gas turbine engine (step 110). The vibratory pattern comprises the vibration frequency and the vibration amplitude. Detecting the vibratory pattern comprises measuring the vibration frequency and the vibration amplitude. As noted previously, a shift in the vibration frequency and diminution in the vibration amplitude indicates a progression toward failure (i.e., progression along the trajectory toward the imbalance response) from the impulse response.

The method 100 for estimating residual useful life of a rolling element bearing in an operating gas turbine engine continues by comparing the vibratory pattern to a reference vibratory pattern (e.g., as determined, for example, by a spectral diagram such as shown in FIG. 2) in a failure propagation stage of a plurality of successive failure propagation stages (Stage 1, Stage 2, Stage 3, and Stage 4) (step 120), i.e., the measured real time vibration parameter (e.g., vibration frequency and vibration amplitude) is compared against a reference vibration parameter. A deviation from the reference vibratory pattern indicates progression toward failure of the rolling element bearing. The method for estimating residual useful life of a rolling element bearing in an operating gas turbine engine continues by identifying the failure propagation stage in which the vibratory pattern substantially matches the reference vibratory pattern (step 130). As used herein, the term "substantially" in this context only means that the vibration frequency and vibration amplitude are within the reference vibration frequency and vibration magnitude ranges of the particular stage. The particular ranges depend on the vibrational environment.

The method for estimating residual useful life of a rolling element bearing in an operating gas turbine engine continues by correlating the failure propagation stage to the residual useful life remaining in the rolling element bearing (step 140). For example, if the rolling element bearing is determined to be in Stage 4, the residual useful life is limited (see, e.g., FIG. 5). However, the degree that the remaining useful life is limited may further be determined by reference to the health score. In the depicted embodiment of FIG. 5, a health score of 8 correlates to a longer residual useful life than a health score of 10. The health score of 8 relative to the health score of 10 in the depicted embodiment reflects percentages of the measured vibration frequency relative to the reference vibration frequency and the measured vibration amplitude relative to the reference vibration amplitude. For example, the health score of 8 may represent a rolling element bearing 12 in a stage where the reference vibration frequency is x and the reference vibration amplitude is y. In the depicted embodiment of FIG. 5, the closer the measured vibration frequency and vibration amplitude is to the high end of the respective range of each, the higher the health score. In the depicted embodiment of FIG. 5, that would translate to a shorter residual useful life.

A system 200 (FIG. 3) for estimating residual useful life of a rolling element bearing in an operating rotor bearing system is also provided in accordance with various embodiments. The system comprises the vibration monitoring system 300 for detecting a vibratory response of the rolling element bearing and the rotor bearing system in an operating gas turbine engine. The vibration monitoring system may include the processor 400 or be separate therefrom. The processor receives a vibration signal representing the vibratory response from the vibration sensor 18 and is configured, in response thereto, to detect a vibratory pattern from the vibratory response. The processor is also configured to compare the vibratory pattern to a reference vibratory pattern in the failure propagation stage of a plurality of successive failure propagation stages (Stage 1, Stage 2, Stage 3, and Stage 4 as previously described). The processor system is further configured to identify the failure propagation stage in which the vibratory pattern matches the reference vibratory pattern, thereby determining the failure propagation stage of the rolling element bearing and correlate the failure propagation stage to the residual useful life remaining in the rolling element bearing.

While the present disclosure has been described with respect to rolling element bearings of aircraft gas turbine engines, it is to be understood that various embodiments may provide benefits for rotor bearing systems of automobiles and in other rolling element bearing applications.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for estimating residual useful life of a rolling element bearing in an operating gas turbine engine, the method comprising:

receiving, by a processor, a vibration signal from a vibration sensor, the vibration signal including a vibratory response of the rolling element bearing;

detecting, by the processor, a vibratory pattern of the rolling element bearing from the vibration signal;

comparing, by the processor, the vibratory pattern to a reference vibratory pattern, the reference vibratory pattern having a plurality of successive failure propagation stages with respective vibratory specific patterns;

identifying, by the processor, a failure propagation stage of the plurality of successive failure propagation stages in which the vibratory pattern substantially matches a respective vibratory specific pattern of the failure propagation stage;

correlating, by the processor, the failure propagation stage to the residual useful life remaining in the rolling element bearing; and generating, by the processor, an output signal representing the residual useful life remaining in the rolling element bearing.

2. The method of claim 1, wherein detecting the vibratory pattern comprises measuring a vibration frequency and vibration amplitude to obtain a measured vibration frequency and measured vibration amplitude.

3. The method of claim 2, wherein detecting the vibratory pattern comprises detecting a change in the vibratory pattern.

4. The method of claim 3, wherein the vibratory pattern comprises a vibration frequency range and a vibration amplitude range and detecting the change in the vibratory pattern comprises detecting a shift in the vibration frequency range and a diminution in the vibration amplitude.

5. The method of claim 2, wherein the vibratory specific patterns comprise a reference vibration frequency range and a reference vibration amplitude range, wherein comparing the vibratory pattern to the vibratory specific patterns comprise comparing the measured vibration frequency against the reference vibration frequency range and the measured vibration amplitude against the reference vibration amplitude in the failure propagation stage.

6. The method of claim 5, wherein comparing the vibratory pattern comprises comparing a spectral diagram of the vibratory pattern against a spectral diagram of the reference vibratory pattern in the failure propagation stage.

7. The method of claim 1, further comprising assigning a health score range to the rolling element bearing within each failure propagation stage.

8. The method of claim 7, wherein assigning a health score range comprises determining a percentage of the vibration frequency and the vibration amplitude within the vibratory pattern.

9. A method for estimating residual useful life of a rolling element bearing of a rotor bearing system in an operating gas turbine engine, the method comprising:

receiving by a processor, a vibration signal from a vibration sensor of the rotor bearing system, the vibration signal including a vibratory response associated with a vibratory pattern of the rolling element bearing;

determining, by the processor, relative contributions of an impulse response and an imbalance response in the vibratory response, the relative contributions defining a vibratory pattern;

comparing the vibratory pattern to a reference vibratory pattern in a failure propagation stage of a plurality of successive failure propagation stages with respective vibratory specific patterns;

identifying a failure propagation stage of the plurality of successive failure propagation stages in which the vibratory pattern substantially matches a respective vibratory specific pattern of the failure propagation stage; and correlating, by the processor, the failure propagation stage to the residual useful life remaining in the rolling element bearing.

10. The method of claim 9, wherein determining, by the processor, the relative contributions of the impulse response and the imbalance response in the vibratory response comprises determining a vibration frequency and a vibration amplitude.

11. The method of claim 10, wherein determining the vibration frequency and the vibration magnitude comprises determining a measured vibration frequency and a measured vibration amplitude.

12. The method of claim 9, wherein the vibratory specific patterns comprise a reference vibration frequency range and a reference vibration amplitude range, wherein comparing the vibratory pattern to the vibratory specific patterns comprise comparing a measured vibration frequency against the reference vibration frequency range and a measured vibration amplitude against the reference vibration amplitude in the failure propagation stage.

13. The method of claim 9, wherein comparing the vibratory pattern comprises comparing a spectral diagram of the vibratory pattern against a spectral diagram of the reference vibratory pattern in the failure propagation stage.

14. The method of claim 9, further comprising assigning a health score range to the rolling element bearing within each failure propagation stage.

* * * * *